A. J. CARLSON.
VEHICLE CONSTRUCTION.
APPLICATION FILED MAR. 28, 1917.
1,252,320. Patented Jan. 1, 1918.
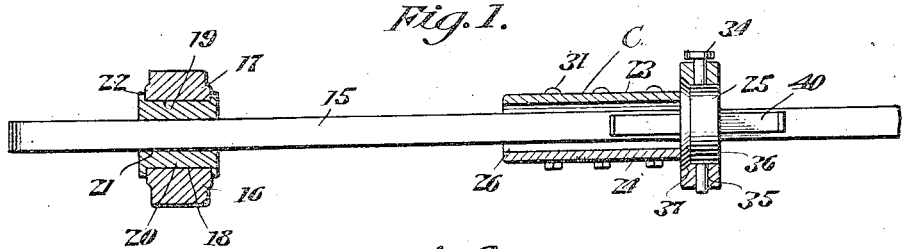
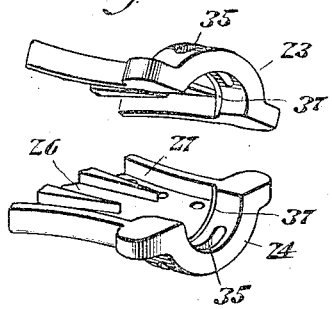
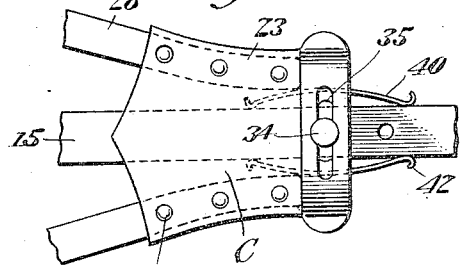
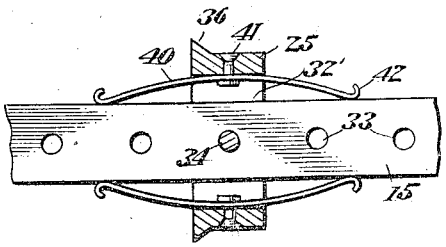
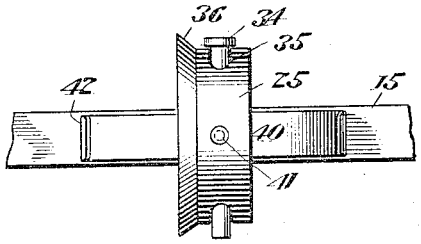
WITNESSES
INVENTOR
A. J. Carlson
BY Victor J. Evans
ATTORNEY

UNITED STATES PATENT OFFICE.

ARTHUR J. CARLSON, OF DOVETAIL, MONTANA.

VEHICLE CONSTRUCTION.

1,252,320.        Specification of Letters Patent.      Patented Jan. 1, 1918.

Application filed March 28, 1917. Serial No. 158,018.

*To all whom it may concern:*

Be it known that I, ARTHUR J. CARLSON, a citizen of the United States, residing at Dovetail, in the county of Fergus and State of Montana, have invented new and useful Improvements in Vehicle Constructions, of which the following is a specification.

This invention relates to wagons and it has particular reference to the running gear of farm and lumber wagons.

In the use of wagons of this character on rough and mountainous roads it is found that the reach bar is extremely liable to breakage, this being mainly due to the twisting action on said bar which is caused when a wheel at either side of the wagon sinks into a rut or declivity, thereby causing one of the axles to become twisted to an oblique position. If a heavy load is carried, breakage of the reach is almost inevitable under such circumstances.

The present invention has for its object to produce a running gear of simple and improved construction whereby freedom of oscillation of the rear axle about the axis of the reach will be obtained, this being found to have the desired effect of avoiding twisted action upon the reach.

A further object of the invention is to simplify and improve the construction and arrangement of parts whereby the desired action is obtained.

A further object of the invention is to produce a device of the character described, of modified construction, in which relative oscillatory action between the reach bar and the rear axle will be obtained and by which at the same time a limited lateral movement of the reach bar will be permissible.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,

Figure 1 is a view in side elevation of the reach bar, the rear axle being shown in section.

Fig. 2 is a perspective detail view showing the clamp plates separated from each other.

Fig. 3 is a top plan view.

Fig. 4 is a horizontal sectional view of a portion of the device.

Fig. 5 is a detail view in side elevation of a portion of the spring supported reach bar and its supporting collar.

Corresponding parts in the several figures of the drawings are denoted by like characters of reference.

The reach bar 15 of the improved device is of ordinary construction consisting of a plank or bar of rectangular cross section. The rear axle 16 and the bolster 17 are provided with opposed semi-circular recesses 18, 19, combining to form a bearing in which a sleeve 20 is supported for rotation, said sleeve having a bore 21 of rectangular cross section in which the rearward end of the reach bar is fitted. The sleeve is also provided at the ends thereof with annular flanges 22 abutting on the front and rear faces of the axle and bolster, thereby preventing displacement of the sleeve, it being understood that the axle and the bolster are securely connected together in any conventional and well known manner.

C is a clamp device comprising top and bottom plates 23, 24, the opposed faces of which are provided with cavities combining to form a bearing for a rotary collar 25. The opposed faces of the clamp plates 23, 24 are provided with central longitudinal grooves 26 for the passage of the reach bar and with opposed divergent grooves 27 in which the forward ends of the hounds 28 are secured, the rearward ends of said hounds being extended between the opposed faces of the axle and the bolster and secured by means of clips 30. The clamp plates 23, 24 are secured together by fastening members such as bolts 31 which also extend through the forward ends of the hounds for the purpose of securing the latter in position. The rotary collar 25 has a bore 32 of rectangular cross section for the passage of the reach bar. The latter is provided with a plurality of apertures 33 for the passage of a connecting bolt or pin 34 whereby it is adjustably connected with the collar 25 and with the clamp plates, the latter being each provided with a transverse slot 35 through which the connecting member 34 extends, thereby permitting rocking movement of the collar 25 with respect to the clamp device.

The collar 25 is provided with a flange 36 at the rearward end thereof, said flange being accommodated in grooves 37 in the opposed faces of the clamp plates. Lengthwise displacement of the collar 25 with respect to the reach is thereby prevented.

It will be observed that by the construction thus far described the clamp device C is rigidly supported with respect to the rear axle by means of hounds 28. The reach bar is longitudinally adjustable with respect to the clamp device and the rear axle when the connecting member 34 is removed, thereby enabling the length of the reach controlling the distance between the front and rear axles of the running gear to be varied. When the device is in operation, if one of the hind wheels should sink in a rut, the hind axle and the clamp device, by reason of the sleeve 20 and collar 25, will be free to rotate about the axis of the reach bar. Conversely, if a front wheel should sink into a rut, the reach bar with the collar 25 and the sleeve 20 will be free to rotate in the bearings provided for said sleeve and collar. Twisting strain on the reach bar will thus be rendered impossible and the strength, durability and life of the running gear will thus be greatly increased.

It may be desired under many circumstances to produce a construction whereby a limited swaying or lateral movement of the reach bar will be permissible. To provide for such a contingency, the construction illustrated in Figs. 3, 4 and 5 of the drawings is resorted to. By this construction the bore of the collar 25, here designated by 32', is made of a width materially exceeding the width of the reach bar and flat longitudinally curved springs 40 are secured on the inner side walls of the bore 32' by fastening members such as rivets 41, said springs being provided with upturned ends 42 abutting on the side faces of the reach bar which will thereby be normally held positioned about midway between the side walls of the bore 32'. Lateral or swaying movement of the reach bar with respect to the collar 25 will thus be rendered possible, the ends of the connecting member 34 being free to move in the slots 35 of the clamp plates. Such lateral or swaying movement, however, will not interfere with the freedom of the collar 25 to rotate with respect to the clamp plates in the manner herein previously described. By the construction just described the tendency to side strain on the reach bar will be overcome, and a very flexible and yet strong and durable construction will be obtained. It may be added that the construction illustrated in Figs. 3, 4 and 5 will not necessitate any alteration in the construction or arrangement of the sleeve 20 with respect to the bolster and the rear axle, the motion of said sleeve caused by the swaying movement of the reach bar being so slight as to be practically imperceptible.

A particular advantage of this invention resides in the fact that the parts of the device are few and free from complication. The parts practically consist, in addition to the necessary bolts or connecting members, of only four parts, viz., the clamp plates, the collar 25 and the sleeve 20, said parts consisting of castings which may be produced at small expense. These devices may also be quickly and inexpensively installed upon any running gear of ordinary conventional construction, necessitating no special or complicated parts, and requiring no skilled labor in the installation thereof.

Having thus described the invention, what is claimed as new is:

In a running gear, an axle and a bolster, a sleeve fitted rotatably therebetween, a clamp device, hounds rigidly assembled with said clamp device and extended between the axle and the bolster and there secured, a collar fitted for rotation in the clamp device, a reach bar extending through the collar and through the rotary element between the axle and the hounds, said reach bar being of rectangular cross section, and said collar having a bore of rectangular cross section and of a width materially exceeding the width of the reach bar, said bar being also free to move laterally with respect to the clamp device, and springs secured on the side walls of the bore of the collar and terminally engaging the side faces of the reach bar, and a connecting element extending vertically through the collar and the reach bar, the clamp device being provided with transverse slots in top and bottom portions thereof to permit lateral movement of the connecting member.

In testimony whereof I affix my signature.

ARTHUR J. CARLSON.